United States Patent [19]

Rudd et al.

[11] 4,241,284

[45] Dec. 23, 1980

[54] ELECTRICAL CONTACT APPARATUS FOR HIGH FREQUENCY WELDING

[75] Inventors: Wallace C. Rudd, New Canaan; Humfrey N. Udall, Darien, both of Conn.

[73] Assignee: Thermatool Corporation, Stamford, Conn.

[21] Appl. No.: 968,286

[22] Filed: Dec. 11, 1978

[51] Int. Cl.³ .................... B23K 11/00; B23K 31/06
[52] U.S. Cl. .................................. 219/61.2; 219/8.5; 219/61.7
[58] Field of Search .................... 219/61.2, 61.4, 61.7, 219/107, 8.5; 174/15 WF

[56] References Cited

U.S. PATENT DOCUMENTS

| | | | |
|---|---|---|---|
| 2,821,619 | 1/1958 | Rudd | 219/107 |
| 2,833,910 | 5/1958 | Stanton | 219/61.7 |

*Primary Examiner*—E. A. Goldberg

*Attorney, Agent, or Firm*—Brooks, Haidt, Haffner & Delahunty

[57] ABSTRACT

Apparatus for supporting and feeding high frequency electric current to a pair of contacts for engaging a work piece or pieces and supplying current thereto in which a co-axial line has relatively movable inner and outer conductors with a pair of contacts respectively mounted at one end of each conductor, electric current being supplied to the conductors adjacent the other ends of the conductors. In one embodiment, the conductors are rotatable and the contacts are mounted on radially extending arms secured to the ends of the conductors. In other embodiments, one conductor is rotatable and the other conductor is axially movable, one contact being mounted on a radially extending arm secured to the rotatable conductor and the other contact being secured to the end of the axially movable conductor. Also, flexible lead and conductive bearing current feed systems and contact mounting arms which are readily convertible into an induction coil support.

18 Claims, 11 Drawing Figures

ELECTRICAL CONTACT APPARATUS FOR HIGH FREQUENCY WELDING

This invention relates to electrical contacts for supplying high frequency electric current to metal parts for the purpose of producing a weld therebetween and particularly, to the mounting apparatus for maintaining such contacts against the parts and for supplying high frequency current thereto.

Methods and apparatus for welding parts together using high frequency electric currents supplied to the parts through contacts to heat the parts to be joined to welding temperature are well known in the art. See, for example, U.S. Pat. Nos. 2,821,619; 2,833,910; 2,873,353 and other patents assigned to the assignee of this application. In such methods, the contacts are in sliding engagement with the moving parts, and in order to avoid arcing and other problems, the contacts must remain in proper contact with the parts to which they supply current. However, a part may have an irregular surface, and usually, it vibrates or otherwise follows a varying path. As a result, the contacts must be able to move with the parts and have a relatively low inertia.

The contacts are located close to the weld area, and the contacts, as well as their supports, are exposed to smoke, spume, metal particles, etc. Ideally, the contacts and their supports should be constructed so that the adverse effects of such performance interfering matter are kept to a minimum.

The currents which the contacts and the electrical leads thereto carry may be of the order of 1500 to 2000 amperes or more which means that they must be cooled, such as by high pressure water cooling, to avoid overheating of the contacts and the leads.

At the high current frequencies involved, that is frequencies of at least 50 kHz and usually about 400 kHz, the inductance of the contact support and lead system is significant and is significantly affected by their construction and the spacing of the leads. It is desirable that the inductance thereof be small, and it is important that the inductance remain relatively constant with movement of the contacts in order to avoid variations in the magnitude of the current supplied to the parts and hence, variations in the heating of the parts.

Other desirable characteristics of the contact and its support and lead system are ease of manufacture, each of displacement of the contacts to permit initial insertion of the parts into welding positions, good resistance to electrical breakdown and a shape which will not interfere with the rolls used to squeeze the parts together at the weld point. Some of such problems and characteristics are referred to in U.S. Pat. No. 3,056,882.

One object of the invention is to provide contact support apparatus for use in high frequency welding methods which has the aforesaid desirable characteristics, which is resistant to the effects of foreign material, which has a low and substantially constant inductance with contact movement and which causes the contacts to follow rapid variations in the path of movement of the surfaces which they engage.

In accordance with the preferred embodiment of the invention, one contact is supported from a first end of the inner conductor of a low impedance co-axial transmission line and the other contact is supported from the corresponding first end of the outer conductor of said line. Both the inner and outer conductors are supported so that they are movable with respect to each other while maintaining a substantially constant impedance, and the opposite second ends of the inner and outer conductors are connected to the source of high frequency current either through conductive bearings or flexible leads. In one embodiment, the inner and outer conductors are independently rotatable about a common axis and the contacts are supported by arms secured to the first ends of the conductors and extending radially of said axis. In another embodiment, one contact is similarly supported at the first end of one of the conductors which is rotatable about said axis whereas the other contact is supported from the first end of the other conductor so that it faces axially away from the other conductor, such other conductor being movable axially but being non-rotatable. In both embodiments, the conductors are urged in the direction which will cause the contacts to engage the parts by means such as a fluid operable piston and cylinder means or spring means.

Other objects and advantages of the present invention will be apparent to those skilled in the art from the following detailed description of presently preferred embodiments, which description should be considered in conjunction with the accompanying drawings in which:

FIG. 3 is a plan view, partly in cross-section, of the apparatus shown in FIGS. 1 and 2 and is taken along the line 3—3 indicated in FIG. 1;

Figure 1:
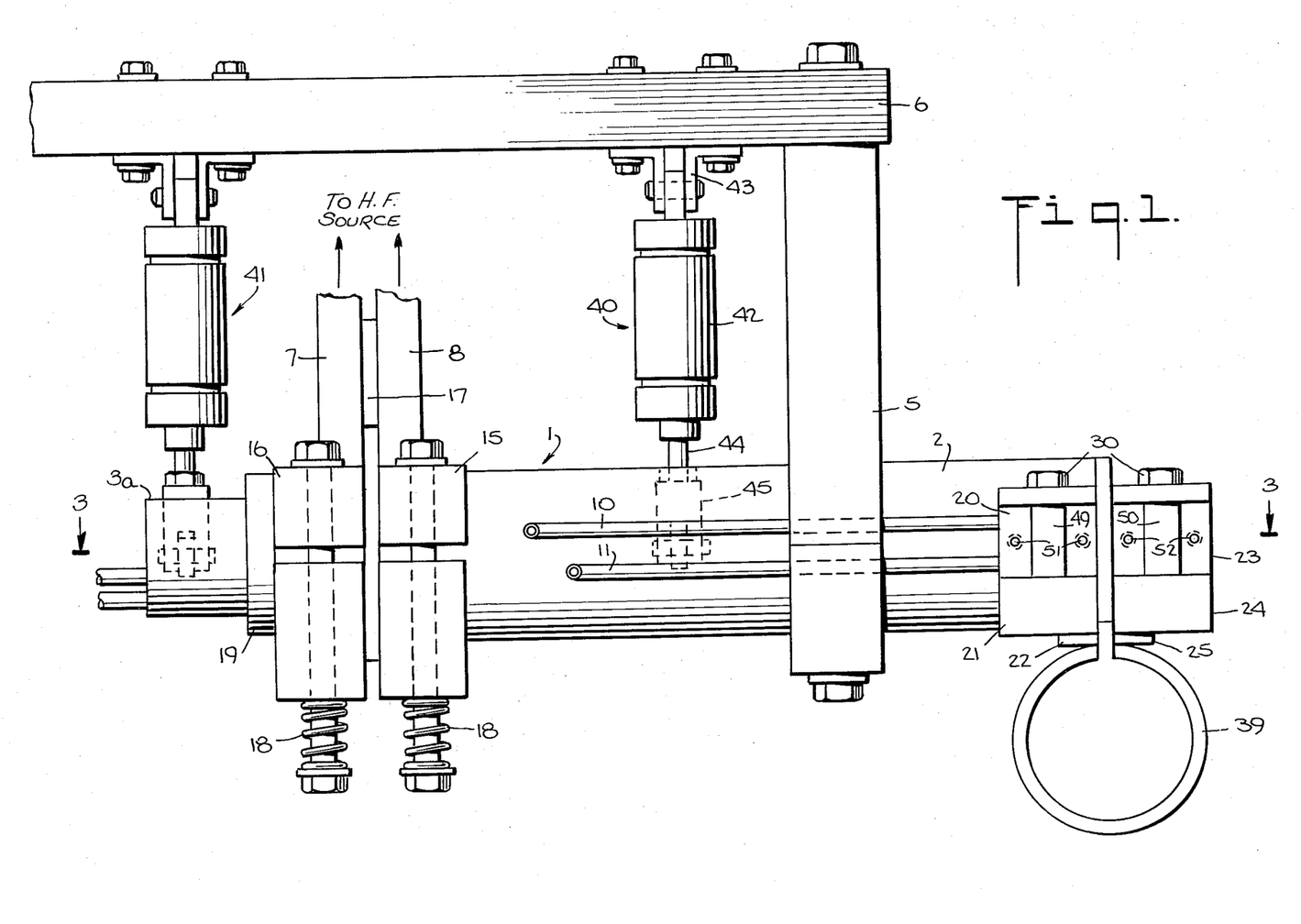
FIG. 1 is a side elevation view of the preferred embodiment of apparatus in which both contacts are pivotable about a common axis.
Figure 2:
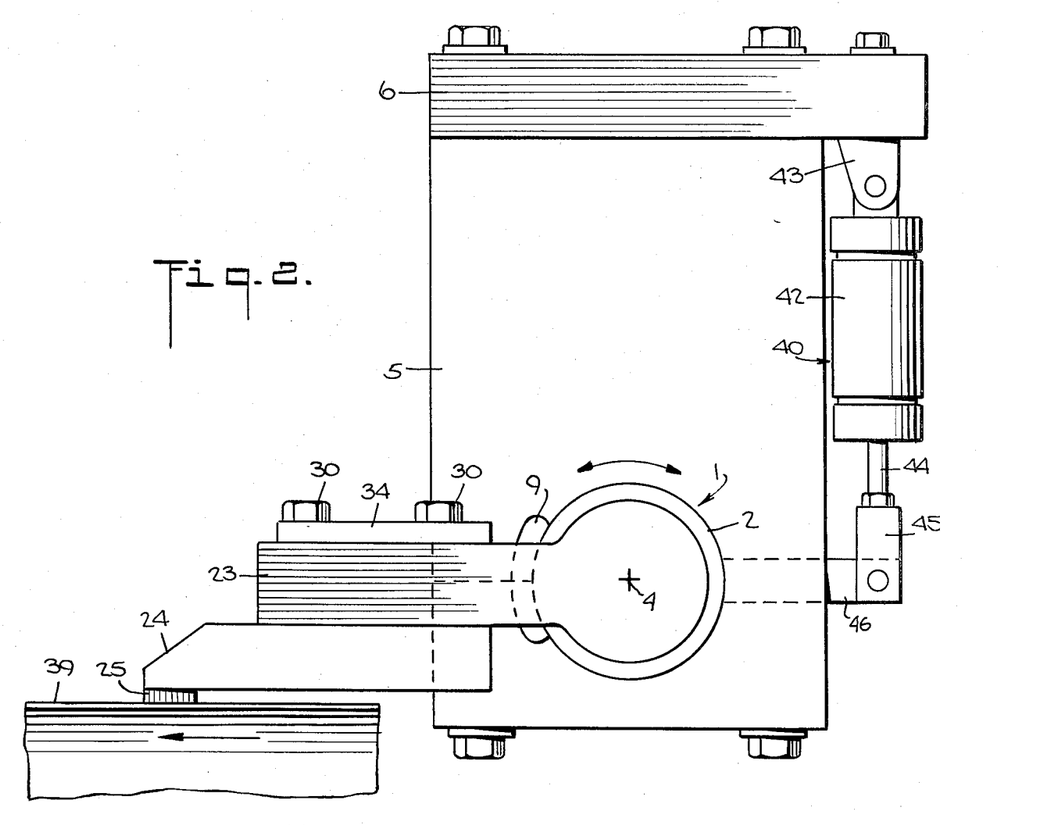
FIG. 2 is an end elevation view of the apparatus shown in FIG. 1.

The contact mounting and support apparatus illustrated in FIGS. 1–3 comprises a co-axial transmission line 1 having an outer conductor 2 and an inner conductor 3 each of which is rotatable through a few degrees around a common axis 4. The outer conductor 2 is supported intermediate its ends by a bracket 5, preferably, made of insulating material and secured at one end to a shelf 6, preferably, made of insulating material, which may support a high frequency transformer (not shown) to which the leads 7 and 8 connect. The bracket 5 has a sliding fit with the conductor 2 so that the latter may rotate as required and has a clearance slot 9 to allow for movement of the cooling tubes 10 and 11 which are secured to the outer conductor 2, such as by brazing.

The inner conductor 3 is rotatably supported on the outer conductor 2 by means of bearings 12 and 13 of insulating material, e.g. tetrafluoroethylene, and the remaining space between the inner and outer conductors 3 and 2 may be filled with wrapped insulating sheet material 14, e.g., also made of tetrafluoroethylene.

The outer conductor 2 is also supported at its end 2a by a conductive bearing 15 which is spring loaded by springs, such as the spring 18, and which is conductively connected to the lead 8. The leads 7 and 8 may be relatively rigid bars of copper mechanically supported at their ends remote from the bearings 15 and 16 and spaced by insulating material 17, e.g. tetrafluoroethylene. The conductive bearing 16 is similar to the bearing 15, is spring loaded by springs, such as the spring 18, and supports the inner conductor 3 near its end 3a. An adjustable, end-play collar 19 is secured to the inner conductor 3 and engages a side of the bearing 16.

Conductively secured to the opposite end 2b of the outer conductor 2, such as by brazing, is an arm 20 which carries a support 21 for a first contact 22. Similarly secured to the corresponding end 3b of the inner conductor 3 is an arm 23 which carries a support 24 for a second contact 25. The faces of the contacts 22 and 25 lie in planes parallel to the axis of the line 1 and also face in a direction perpendicular to the direction of such axis. As is best shown in FIGS. 3 and 6, the arms 20 and 23 are similar in construction, the arm 20 having internal channels 26 and 27 and the arm 23 having internal channels 28 and 29 for cooling water. Each arm 20 and 23 is secured to its corresponding contact support 21 and 24 by bolts 30 and the channels, at the bottom faces of the arms, are aligned with a channel, such as the channel 31, in the contact support, 21 or 24. O-rings 32 and 33 provide water-tight seals between the arms and the contact supports. As shown in FIG. 6, the channels, 28 and 29 or 26 and 27, may extend upwardly to the upper surfaces of the arms, 23 and 20, for purposes hereinafter described, but such channels are sealed at the upper surfaces in the embodiment shown in FIG. 6 by a plate 34 and O-rings 35 and 36. Of course, it will be apparent that the arms 20 and 23 may have a simpler construction, and for example, the arms 20 and 23 may be integral with the supports 21 and 24.

Cooling water is circulated in the channels 28 and 29 by way of the tube 37, the interior of the inner conductor 3 and the tube 38, and the channels 26 and 27 interconnect with the cooling water tubes 10 and 11.

The embodiment shown in FIGS. 1–3 is particularly useful for producing a longitudinal seam at the edges of a strip of metal being formed into a tube. FIG. 1 illustrates such a strip 39 with the contacts 22 and 25 engaging the strip 39 at its edges. The arms 20 and 23, and hence, the contacts 22 and 25 are respectively urged or biased toward the strip 39 by air operable piston and cylinder assemblies 40 and 41 so as to maintain the contacts 22 and 25 in contact with the strip 39 as it is moved longitudinally during the welding thereof. The assembly 40 rotates the outer conductor 2, and the assembly 41 rotates the inner conductor 3. The assemblies 40 and 41 may also be used to lift the contacts 22 and 25 away from the welding area when it is desired to feed the strip 39 into welding position.

Since both assemblies 40 and 41 are the same, only the assembly 40 will be described in further detail. The assembly 40 comprises a cylinder 42 pivotally mounted at one end from a bracket 43 secured to the shelf 6. A piston rod 44 carries a yoke 45 pivotally connected to an arm 46 secured, such as by brazing, to the outer conductor 2. When the shelf 6 is made of insulation the assemblies 40 and 41 are insulated from ground, but preferably, at least the cylinder 42 is insulated from the conductor 2 by making the rod 44, the yoke 45 and/or the arm 46 of insulating material. Of course, if the arm 46 is made of insulating material, it would be secured to the conductor 2 by other than brazing, such as by making it an extension of a collar which surrounds and is clamped on the conductor 2. Although the use of the assemblies 40 and 41 is preferred, it will be apparent that springs may be substituted for the assemblies 41 and 42.

From an examination of FIGS. 1 and 3, it will be noted that, immediately adjacent the welding area, the parts are sealed with respect to the ingress of dirt and other particles. Also, except when there is a large difference between the levels of the contacts 22 and 25, which would be very unusual and only occur if the welding is proceeding improperly, there is very little, if any, change in the spacing and the size of the facing areas of the current carrying conductors, the leads 7 and 8, the bearings 15 and 16, the conductors 2 and 3, the arms 20 and 23 and the supports 21 and 24, during normal up and down movements of the contacts 22 and 25. This latter means that during the welding, there is little, if any, change in the inductance of the contact current feed system. Furthermore, since the spacings between the current carrying conductors may be relatively small and the conductors may be relatively large, the impedance thereof may be relatively low.

In the embodiment illustrated in FIGS. 1–3, high frequency current is supplied to the inner and outer conductors 3 and 2 by the bearings 15 and 16 which have sliding contact with the conductors 2 and 3. Since the electrical resistance at contacts usually is higher than the resistance of the current supplying leads, there is undesirable power loss and heating at the contacts. To reduce such power loss and heating as well as to avoid possible arcing and a place where dirt and other particles can enter, it may be desirable to eliminate the bearings 15 and 16 to supply current to the outer and inner conductors 2 and 3 by flexible leads secured thereto, such as by brazing. However, even though the amount of relative rotation between the outer and inner conductors is small care should be taken to avoid impedance changes because of rotation of the conductors 2 and 3 and consequent movement of one lead with respect to the other.

Figure 4:
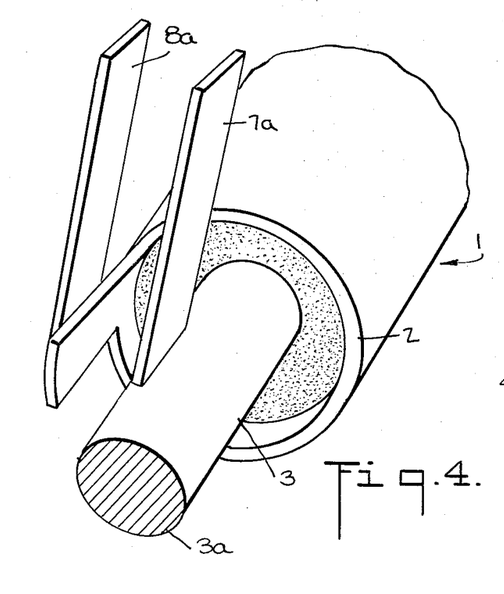
FIGS. 4 and 5 are fragmentary, perspective views illustrating alternate ways of supplying high frequency current to the conductors of a co-axial line on which the contacts are mounted.

FIG. 4 illustrates schematically a pair of flexible leads 7a and 8a, corresponding to the leads 7 and 8 shown in FIG. 1, which are conductively secured at their ends, such as by brazing, respectively, to the inner conductor 3 and the outer conductor 2 of the co-axial line 1. With the small amounts of rotation of the conductors 2 and 3 during welding, there is no change in the size of the facing surface areas of the leads 7a and 8a and the conductors 2 and 3, and there is very little change in the spacing of the leads 7a and 8a. Accordingly, the impedance of the current supply conductors remains substantially constant with movement of the contacts 22 and 25 during welding. As with the previous embodiment, the outer conductor 2 is rotatable by the assembly 40, and the inner conductor 3 is rotatable by the assembly 44 connected to the extension 3a of the inner conductor 3.

Figure 5:
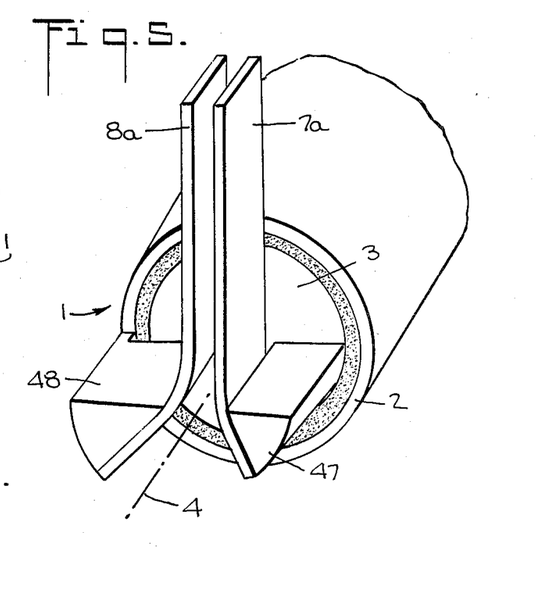
Figures 5, 6:
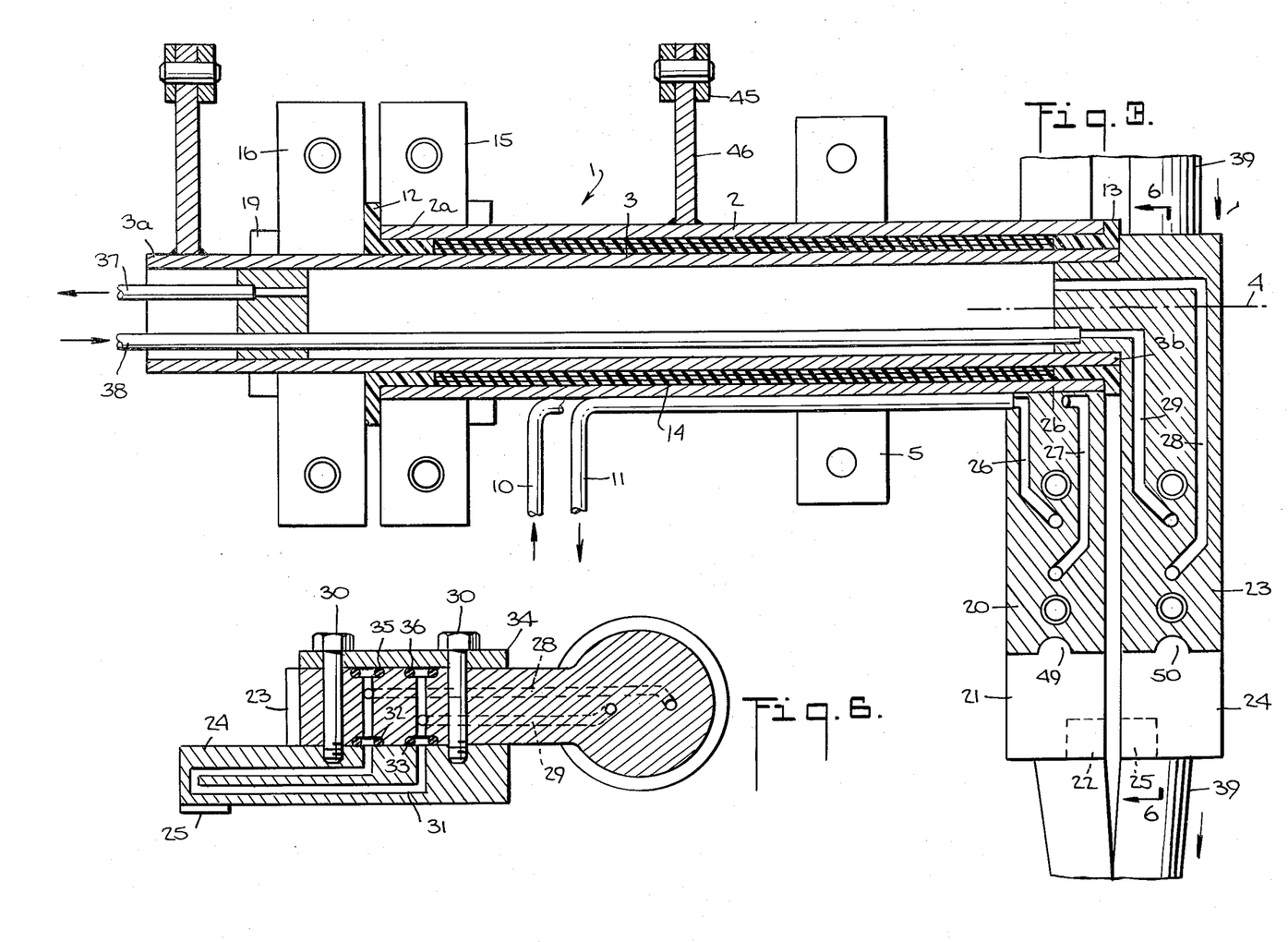
FIG. 6 is a cross-sectional, end elevation view of a contact mounting arm and is taken along the line 6—6 indicated in FIG. 1.

A preferred way to secure the leads 7a and 8a to the outer and inner conductors 2 and 3 is illustrated schematically in FIG. 5. In FIG. 5, the outer and inner conductors 2 and 3 are provided with conductive lugs 47 and 48 conductively secured to the inner and outer conductors 3 and 2, such as by brazing. The lugs 47 and 48 are shaped and positioned so that the leads 7a and 8a are disposed on opposite sides of, and close to, the axis of rotation 4. With such arrangement, the size of the facing surface areas of the leads 7a and 8a, etc. remains constant and the spacing between the leads 7a and 8a changes very little, e.g. of the order of 0.13 inches, with movement of the contacts 22 and 25 during welding. As with the first embodiment, the outer conductor 2 is rotatable by the assembly 40, and the inner conductor 3 may be rotatable by the assembly 40 through an arm connected to the lug 47.

In the embodiments shown in FIGS. 4 and 5, it may be sufficient to have only the support 5, but if desired or required, a second support 5 at the position of the bearing 15 may be used.

As indicated previously, the construction of the arms 20 and 23 and the supports 21 and 24 shown in FIGS. 1-3 and 6 is more complicated than is required if the apparatus is to be used only for one type of welding, e.g. tube welding. On the other hand, making the supports 21 and 24 separate and detachable from the arms 20 and 23 has the advantage that the parts subject to wear during welding, namely, the contacts 22 and 25 which are secured to the supports 21 and 24 by brazing, may be quickly and easily replaced without changing the arms 20 and 23 or attempting to braze contacts to the latter. Thus, by merely removing the bolts 30, the supports 21 and 24 may be removed and replaced by new supports 21 and 24 with new contacts 22 and 25.

In addition, the support and current supply apparatus of the invention may be used to support and supply current to an induction coil used for heating or welding purposes even though such a coil normally is stationary during such heating or welding. With the apparatus of the invention, an installation may be easily converted from one which supplies current to metal parts through contacts to one which induces current in the parts with a coil, and the position of the coil with respect to the parts may be readily adjusted by means of the assemblies 40 and/or 41.

Figures 7, 8, 9:
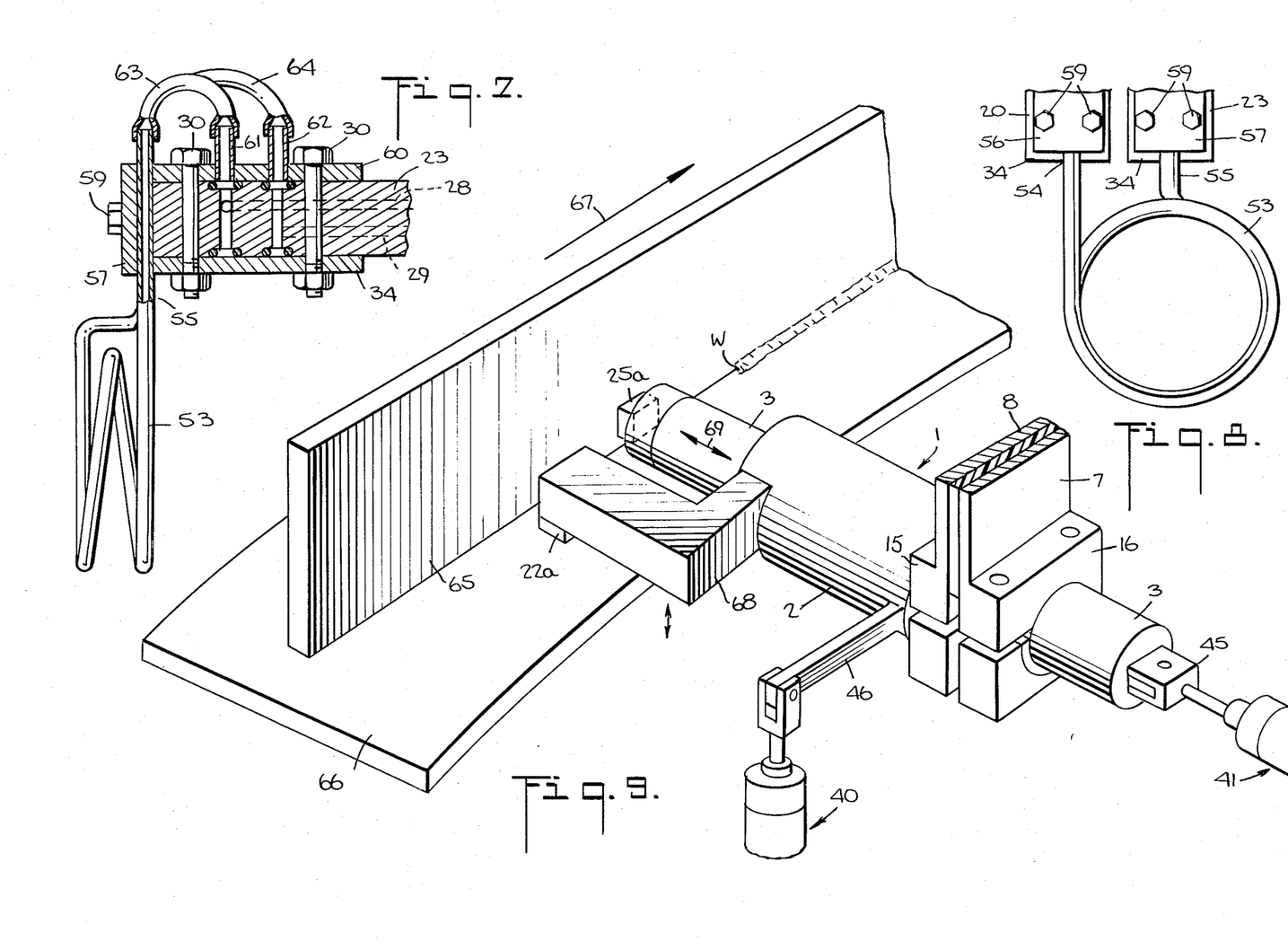
FIGS. 7 and 8 are, respectively, cross-sectional, end elevation and side elevation views illustrating the use of a portion of the arm shown in FIG. 6 for supporting an induction coil.
FIG. 9 is a perspective view of a preferred embodiment of apparatus in which one contact is pivotable about an axis and the other contact is reciprocable parallel to such axis.

It will be observed from an examination of FIGS. 1, 3 and 6 that the arms 20 and 23 have arcuate grooves 49 and 50 and threaded holes 51 and 52 as well as the upward extensions of the channels 28 and 29 which are not used when supports 21 and 24 are mounted on the arms 20 and 23. As illustrated in FIGS. 7 and 8 an induction coil 53 of metal tubing may be mounted on the arms 20 and 23 in place of the supports 21 and 24. Thus, the lead portions 54 and 55 of the coil 53 are received in the grooves 49 and 50 and held therein by plates 56 and 57 secured to the arms 20 and 23 by bolts 59 received in the holes 51 and 52. Two plates 34 are placed at the bottom surfaces of the arms 20 and 23 to seal the portions of the channels 28 and 29 which previously fed cooling water to the supports 21 and 24, and a plate 60, carrying short lengths 61 and 62 of tubing and secured to the plate 60 with a water tight seal, replace the plate 34 formerly at the top surface of the arm 23. A further plate, not shown but like the plate 34 and having a coolant channel therein, is employed at the top surface of the arm 20 to interconnect the upper extensions of the channels 28 and 29 so as to permit the circulation of cooling water in the arm 20. The tube 61 is connected with the portion 55 by a length of tubing 63, and the tube 62 is interconnected with the portion 54 by a length of tubing 64, both the tubing 63 and the tubing 64 being made of an insulating material, e.g. rubber.

From the foregoing, it will be apparent that one end of the coil 53 is connected to the inner conductor 3 through the arm 23, and the other end of the coil 53 is connected to the outer conductor 2 through the arm 20. Cooling water is supplied to the coil 53 through the inner conductor 3 and the arm 23. It will also be apparent that the apparatus of the invention may be used for supporting and supplying current to either a pair of contacts or an induction coil.

In the embodiment of the invention illustrated in FIGS. 1-6, the contacts 22 and 25 face in the same direction and the outer and inner conductors 2 and 3 are rotatable relative to a common axis 4. In some types of welding, the parts are disposed so that the contacts must face in different directions. FIG. 9 illustrates schematically a modification of the first embodiment which may be used to weld the edge surface of a metal plate or strip 65 to an intermediate portion of another metal plate or strip 66.

In the embodiment of the invention illustrated in FIG. 9, the structure is the same as shown in FIGS. 1-3 except at the contact carrying ends of the outer and inner conductors 2 and 3 and except for the fact that the piston and cylinder assembly 41 moves the inner conductor 3 axially rather than rotates it around its axis. Accordingly, the structure shown in FIGS. 1-3 has not been illustrated in detail and parts have been omitted for the purpose of simplicity.

As shown in FIG. 9, the contact 25a, which faces in a direction parallel to the axis of the line 1 and which is conductively secured to the end of the inner conductor 3, engages a surface of the strip 65 while it and the strip 66 are pulled in the direction of the arrow 67 and brought together at a weld point W. The contact 22a, which faces in a direction perpendicular to the direction of the axis of the line 1 and which is conductively secured to and supported by a conductive arm 68 which is conductively secured to the outer conductor 2, engages a surface of the strip 66. The contact 25a is urged toward the strip 65 by the assembly 41 connected to the opposite end of the inner conductor 3 which is movable in the directions indicated by the double ended arrows 69 and hence, parallel to the axis of the co-axial line 1. The contact 22a is urged toward the strip 66 by the assembly 40 in the manner described in connection with the first embodiment. Because there is almost no change in the spacing or size of the facing areas of the arm 68 and the conductor 3, there is very little change in the impedance of the apparatus shown in FIG. 9 with movement of the contacts 22a and 25a during welding. As with the first embodiment, springs may be substituted for the assemblies 40 and 41.

Instead of supplying current to the outer and inner conductors 2 and 3 through the bearings 15 and 16 as shown in FIG. 9, the current may be supplied through leads secured to the conductors 2 and 3 in the manner described in connection with FIGS. 4 and 5.

Figure 11:
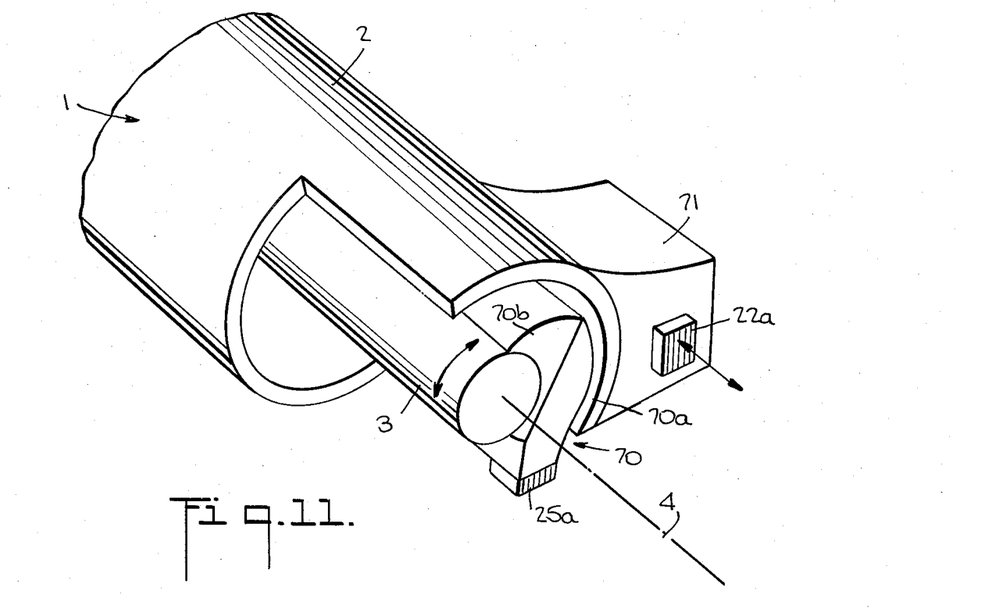
FIG. 11 is a fragmentary, perspective view of a modification of the embodiment shown in FIG. 9.

In the embodiment shown in FIG. 9, the inner conductor 3 is movable axially and the outer conductor 2 is rotatable. As illustrated in FIG. 11 the inner conductor 3 may be rotatable and the outer conductor 2 may be movable axially, and with the arrangement shown in FIG. 11, the use of an arm 68 which is relatively widely separated from the inner conductor 3, and consequent impedance discontinuity, is avoided.

In FIG. 11, the contact 25a is conductively secured, such as by brazing, to an arm 70 which is conductively secured to the conductor 3, and the contact 25a faces in a direction perpendicular to the direction of the axis of the line 1. The surface of the arm 70 nearest the outer conductor 2 has a curvature corresponding as closely as possible to the curvature of the inner surface of the conductor 2 so that there is little, if any, change in impedance with rotation of the conductor 3. Preferably, the arm 70 is made in two parts 70a and 70b, which are bolted together, so that the contact 25a may be replaced by removing the part 70a with the contact 25a thereon and substituting another part 70a with a new contact 25a thereon.

The contact 22a is conductively secured to an arm 71 which is conductively secured to the outer conductor 2, and the contact 22a faces in a direction parallel to the axis of the line 1. The contacts 25a and 22a may be urged toward the work pieces by assemblies 40 and 41 or by springs as described in connection with FIG. 9.

Figure 10:
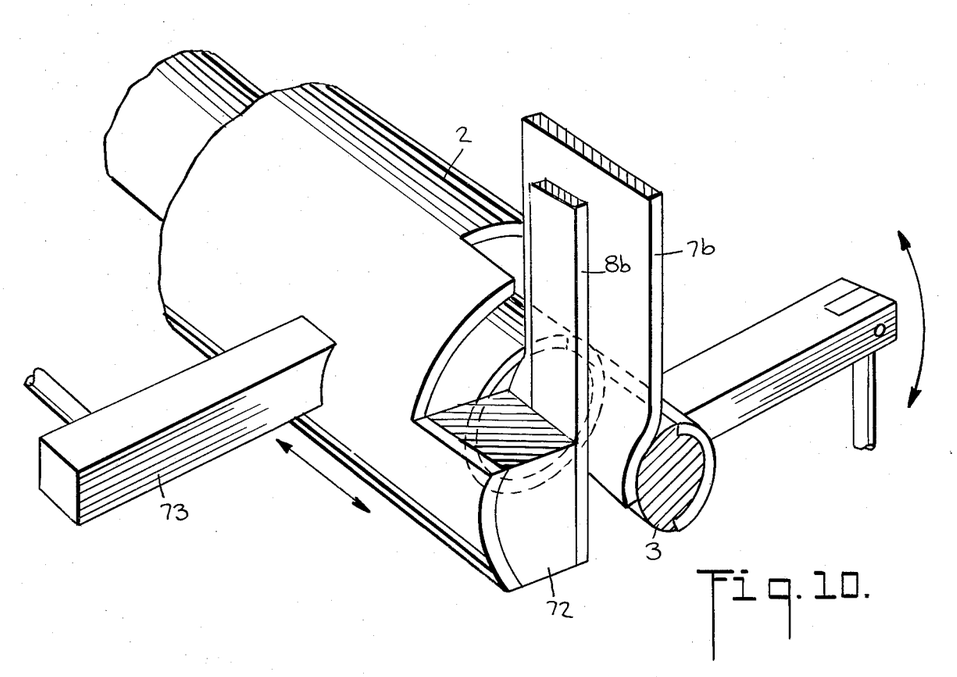
FIG. 10 is a fragmentary perspective view of a way of supplying high frequency current to the conductors of a co-axial line when one of them is rotatable and the other is movable parallel to the axis of the line.

Although current may be supplied to the outer and inner conductors 2 and 3 in the embodiment shown in FIG. 11 by means of conductive bearings as described in connection with FIG. 9, the current may be supplied thereto by flexible leads 7b and 8b as illustrated in FIG. 10. As shown in FIG. 10, the lead 7b is conductively secured to the inner conductor 3, and the lead 8b is conductively secured to a lug 72 conductively secured to the outer conductor 2. The conductor 2 may be moved axially by means of an arm 73 operable by an assembly 40 or 41 or by a spring, and the conductor 3 is rotatable by means of an arm 74 and an assembly 40 or 41 or a spring.

It will be observed that in the embodiment shown in FIG. 10, the lead 7b has an axial dimension greater than the axial dimension of the lead 8b so that as the outer conductor 2 moves axially, there is no change in the area of the facing surfaces of the leads 8b and 7b with normal movement of the conductor 2. Also, with normal movement of inner conductor 3, there is only a small change in the spacing between the leads 7b and 8b.

In the various embodiments described, either both the outer and inner conductors 2 and 3 are independently rotatable about a common axis or one is rotatable about the axis of the coaxial line 1 and the other is movable in a direction parallel to such axis. It may be desirable, in some cases, to make both the inner and outer conductors independently movable in the axial direction in which cases both of the contacts 22a and 25a would be mounted on the ends of the respective conductors of the line 1, like the contact 25a in FIG. 9, and would face in a direction parallel to the axis of the line 1. In the embodiments in which the inner or outer conductor is movable axially, it will be apparent that conventional means, such as a key and keyway, will be used to prevent rotation of such conductor. Also, where air gaps are shown between parts of different electrical potential, it will be apparent that the gaps may be filled with solid insulating material. In addition, channels for cooling fluid will usually be provided in the contact carrying parts.

Although preferred embodiments of the present invention has been described and illustrated, it will be apparent to those skilled in the art that various modifications may be made without departing from the spirit and scope of the invention.

What is claimed is:

1. High frequency electrical contact apparatus for contacting a moving work piece or pieces and supplying electric current thereto, said apparatus comprising:
    a co-axial transmission line having an outer conductor and an inner conductor co-axial with and insulated from said outer conductor;
    mounting means mounting said outer conductor and said inner conductor for movement of each independently of the other without a change of their coaxial relation;
    first conductive contact means conductively secured to said outer conductor at an end thereof and movable therewith;
    second conductive contact means conductively secured to said inner conductor at an end thereof adjacent said end of said outer conductor, said second contact means being movable with said inner conductor;
    first and second biassing means connected respectively to said outer conductor and said inner conductor and urging each of them in a direction which will move said first and said second contact means toward a work piece or pieces; and
    current supplying means at portions of said inner and outer conductor spaced from said end of said outer conductor and said end of said inner conductor in a direction axially of said outer conductor for supplying current to said inner and outer conductors.

2. Apparatus as set forth in claim 1 wherein said first contact means comprises a conductive arm connected at one end to said end of said outer conductor and extending radially of the axis of said outer conductor and a conductive contact conductively secured to the other end of said arm and facing in a direction perpendicular to the direction of said axis, wherein said second contact means comprises a conductive arm connected at one end to said end of said inner conductor and extending radially of the axis of said inner conductor and in closely spaced relation to said arm of said first contact means and a conductive contact conductively secured to the other end of said arm of said second contact means and facing in a direction perpendicular to the direction of said axis and wherein said mounting means mounts each said outer conductor and said inner conductor for rotation about said axis.

3. Apparatus as set forth in claim 2 wherein at least one said arm comprises two separable parts, one of said parts being connected to the conductor and the other of said parts being secured to said one part, the contact being secured to said other of said parts, and releasable means for securing said other of said parts to said one of said parts.

4. Apparatus as set forth in claim 3 wherein said parts have inter-connecting channels for the circulation of a cooling fluid and further comprising means on said coaxial line for supplying cooling fluid to, and removing cooling fluid from, said channels.

5. Apparatus as set forth in claim 1 wherein one of said contact means comprises a conductive arm connected at one end to the said end of the conductor to which said one contact means is secured and extending radially of the last-mentioned conductor and a conductive contact conductively secured to the other end of said arm and facing in a direction perpendicular to the direction of said axis, wherein the other of said contact means comprises a conductive contact conductively secured to the said end of the conductor to which said other contact means is secured and facing in a direction parallel to said axis and wherein said conductor to which said arm is connected is rotatable about said axis and said conductor to which said other contact means is secured is movable parallel to said axis.

6. Apparatus as set forth in claim 5 wherein said arm is connected to said outer conductor and said last-mentioned conductive contact is secured to said inner conductor.

7. Apparatus as set forth in claim 5 wherein said arm is connected to said inner conductor and said last-mentioned conductive contact is secured to said outer conductor.

8. Apparatus as set forth in claim 1 wherein said mounting means comprises a pair of conductive bearings in conductive contact, respectively, with said inner conductor and said outer conductor at said portions thereof, said bearings also being said current supplying means.

9. Apparatus as set forth in claim 1 wherein said current supplying means comprises a pair of flexible leads connected, respectively, to said inner conductor and said outer conductor.

10. High frequency electrical contact apparatus for contacting a work piece or pieces and supplying electric current thereto, said apparatus comprising a tubular outer conductor with an inner conductor mounted coaxially within the outer conductor and insulated from the latter; first conductive bearing means conductively engaging said outer conductor at a first portion thereof and permitting movement of said outer conductor with respect to said bearing means; first conductive contact means conductively secured to said outer conductor at a second portion thereof spaced from said first bearing means in a direction axially of said outer conductor; second conductive bearing means conductively engaging said inner conductor at a first portion thereof adjacent said first portion of said outer conductor and permitting movement of said inner conductor with respect to said second bearing means, said first and said second bearing means being in closely spaced, insulated relation; second conductive contact means conductively secured to said inner conductor at a second portion thereof spaced from said second bearing means in a direction axially of said inner conductor and adjacent said second portion of said outer conductor; and first and second biassing means respectively engaging said outer conductor and said inner conductor for urging said outer and said inner conductor in a direction which will move said first and second contact means toward a work piece or pieces.

11. Apparatus as set forth in claim 10 further comprising insulating bearing means intermediate said outer conductor and said inner conductor and permitting rotation of one said conductor relative to the other said conductor.

12. Apparatus as set forth in claim 11 wherein said insulating bearing means also permits axial movement of said other said conductor.

13. Apparatus as set forth in claim 10, 11 or 12 wherein said outer conductor is said one conductor and wherein said first conductive contact means comprises a conductive arm secured at one end to said outer conductor and extending radially of the axis of said outer conductor and a conductive contact secured to the opposite end of said arm and facing in a direction perpendicular to the direction of the axis of said outer conductor.

14. Apparatus as set forth in claim 13 wherein said inner conductor is said other conductor and wherein said second conductive means is a conductive contact secured to said inner conductor and facing away from said inner conductor and in a direction parallel to the axis of said outer conductor.

15. Apparatus as set forth in claim 10, or 11 wherein said outer conductor is said one conductor, said inner conductor is said other conductor and said insulating bearing means also permits rotation of said inner conductor and wherein said second conductive contact means comprises a conductive arm secured at one end to said inner conductor and extending radially of the axis of said outer conductor and a conductive contact secured to the opposite end of said last-mentioned arm and facing in a direction perpendicular to the direction of sais axis.

16. Apparatus as set forth in claim 10 or 11 wherein said inner conductor is said one conductor, said outer conductor is said other conductor and said insulating bearing means also permits axial movement of said outer conductor, wherein said first conductive contact means is a conductive contact secured to said outer conductor and facing away from said outer conductor and in a direction parallel to the axis of said outer conductor and wherein said second conductive contact means comprises a conductive arm secured at one end to said inner conductor and extending radially of said axis and a conductive contact secured to the opposite end of said arm and facing in a direction perpendicular to the direction of said axis.

17. High frequency electrical contact apparatus as set forth in claim 1 wherein at least one of said conductive contact means comprises a conductive arm comprising two separate parts, one of said parts having a pair of longitudinal channels therein for conveying cooling fluid, said channels extending from adjacent one end thereof to adjacent the other end thereof and connecting, respectively, with a pair of channels extending from the upper surface of said one part to the lower surface thereof, detachable means closing said pair of channels at said upper surface, the other of said parts having a channel therein for conveying a cooling fluid which has a pair of openings in the upper surface of said other part and said other part having its upper surface in engagement with said lower surface of said one part and with said opening aligned, respectively, with said pair of channels, a conductive contact secured to a surface of said other part and releasable means engaging said parts and holding them together.

18. Apparatus as set forth in claim 17 wherein said means closing said pair of channels comprises a plate and said releasable means also engages said plate and also holds said plate against said upper surface of said one part.

* * * * *